US008636203B1

(12) United States Patent
Patterson et al.

(10) Patent No.: US 8,636,203 B1
(45) Date of Patent: Jan. 28, 2014

(54) PARTIAL AUTHORIZATION OF A FINANCIAL TRANSACTION

(75) Inventors: Barbara Patterson, South San Francisco, CA (US); Steve Diamond, Lafayette, CA (US); Todd Brockman, Kentfield, CA (US); Richard Pileggi, Atlanta, CA (US); Amy Dalziel, Campbell, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 1177 days.

(21) Appl. No.: 11/566,596

(22) Filed: Dec. 4, 2006

Related U.S. Application Data

(60) Provisional application No. 60/748,044, filed on Dec. 6, 2005.

(51) Int. Cl.
*G06K 5/00* (2006.01)
*G06Q 40/00* (2012.01)
*G07F 19/00* (2006.01)
*G07D 11/00* (2006.01)

(52) U.S. Cl.
USPC .......................................... 235/379; 235/380

(58) Field of Classification Search
USPC ................... 235/380, 381, 379; 379/114.19; 434/109; 705/39, 41; 710/200
See application file for complete search history.

(56) References Cited

U.S. PATENT DOCUMENTS

| | | | | | |
|---|---|---|---|---|---|
| 3,896,266 | A | * | 7/1975 | Waterbury | 379/114.19 |
| 4,689,018 | A | * | 8/1987 | Trinity | 434/109 |
| 5,920,847 | A | * | 7/1999 | Kolling et al. | 705/40 |
| 6,675,153 | B1 | | 1/2004 | Cook et al. | |
| 6,685,088 | B1 | | 2/2004 | Royer et al. | |
| 7,213,750 | B1 | * | 5/2007 | Barnes et al. | 235/381 |
| 7,797,233 | B2 | * | 9/2010 | Sobek | 705/39 |
| 7,844,490 | B2 | | 11/2010 | Patterson | |
| 2002/0026420 | A1 | * | 2/2002 | DuPhily | 705/41 |
| 2002/0175207 | A1 | * | 11/2002 | Kashef et al. | 235/380 |
| 2004/0225776 | A1 | * | 11/2004 | DiRaimondo et al. | 710/200 |
| 2005/0077350 | A1 | * | 4/2005 | Courtion et al. | 235/380 |
| 2005/0080728 | A1 | * | 4/2005 | Sobek | 705/39 |
| 2005/0199706 | A1 | * | 9/2005 | Beck et al. | 235/380 |
| 2005/0211765 | A1 | * | 9/2005 | Brown et al. | 235/379 |
| 2006/0149670 | A1 | * | 7/2006 | Nguyen et al. | 705/39 |
| 2007/0194108 | A1 | * | 8/2007 | Kalappa et al. | 235/381 |
| 2008/0010189 | A1 | | 1/2008 | Rosenberger | |

OTHER PUBLICATIONS

"Visa's POS Balance Inquiry Service Fact Sheet", a description of gift card service and FAQ, Merchant Consulting, Jan. 27, 2004.

* cited by examiner

*Primary Examiner* — Thien T Mai
(74) *Attorney, Agent, or Firm* — Kilpatrick Townsend & Stockton LLP

(57) ABSTRACT

Embodiments of methods and systems in accordance with the present invention allow partial authorization of a financial transaction. In one embodiment, where a balance of a prepaid card is insufficient to cover the entire amount of a transaction, the issuer of the prepaid card transmits over a payment processing system, approval for only the amount remaining on the card. The transaction can then be completed by the purchaser providing an additional sum from another source, such as a credit card. Such automatic partial authorization in accordance with an embodiment of the present invention avoids the delay and cost associated with having to re-execute the transaction for a less than the entire amount.

18 Claims, 5 Drawing Sheets

PARTIAL AUTHORIZATION OF A FINANCIAL TRANSACTION

CROSS-REFERENCES TO RELATED APPLICATION

The instant nonprovisional patent application claims priority to U.S. Provisional Patent Application No. 60/748,044, filed Dec. 6, 2005, which is incorporated herein by reference in its entirety for all purposes.

BACKGROUND

Prepaid card products have today achieved a critical level of industry, marketplace and consumer acceptance and usage where they can now be considered a stand-alone payment category. These innovative prepaid products also represent some of the most robust growth opportunities for card-based payments today and for the foreseeable future. The growth of these cards and related transaction volumes has been accelerated by virtue of the continuing invention, development and enhancement of sales and usage functionality.

Therefore as an effort to improve upon existing prepaid card transactional capability, it would be desirable to enable information and transaction enhancements that would improve cardholder and merchant experiences and reduce issuer costs associated with consumer services.

Currently, many owners of prepaid products are unsure of their available balance, even though balance information may be available through devices such as telephones, ATM's, and Internet sites. Often, prepaid product cardholders are at a merchant location and do not know whether their available balance is sufficient to complete a purchase at a physical point-of-sale, or over a non-face-to-face purchasing channel such as by telephone or over the internet. Without this information, merchants can experience lost sales or excessive time spent at checkout or over the phone or internet, trying to determine if a sale will be approved.

Also, it is often difficult for the consumer to spend the exact amount available in the prepaid account, as purchases can be for amounts greater than the value available. This can result in unnecessary declines. For example, a consumer may have $25 on her prepaid card, and she may try to purchase a good for $30. This transaction would traditionally be declined, because there is insufficient value associated with the prepaid card to pay for the good.

Recognizing that there are unique opportunities in these situations for both the consumer and the merchant, embodiments of the invention address these issues by improving existing prepaid transaction processes and significantly reducing the uncertainty about a prepaid product's available funds.

FIG. 1A shows a simplified flow diagram illustrating steps of a conventional method for executing a financial transaction. FIG. 1B shows a simplified schematic diagram of the method of FIG. 1A.

In first step 202 of flow 200, a consumer tries to pay for a good or service that costs $50 by using a first portable consumer device such as a prepaid card in a financial transaction. In second step 204, the merchant sends through an electronic payment processing system (such as VisaNet), a request for authorization of the full amount of the transaction.

In step 206, the issuer checks the balance remaining on the prepaid card, and notes that it is less than the full requested purchase amount. Accordingly, the issuer transmits back to the merchant through the electronic payment processing system, a message declining authorization of the transaction. This decline message may, in certain cases, also include the amount of the balance remaining on the prepaid card.

In many prepaid programs, issuers use third party processors for authorization and settlement. For purposes of this application, the term "issuer" refers both to the actual issuer, and to a third party engaged to conduct authorization and settlement on behalf of the issuer.

Upon receipt of the issuer's decline to authorize the transaction, in step 208 the merchant, on its own initiative, may seek to conduct a separate, second financial transaction. In the second financial transaction, the merchant may send another authorization request message to the issuer. It may be used to ask the issuer to approve payment in the amount of the balance associated with the prepaid card (e.g., $25). In step 210, the prepaid card issuer approves the second financial transaction. In step 212, the merchant requests from the consumer the additional portion of the funds to pay for the good. For example, the merchant may ask the consumer to tender an additional $25 to make up for the difference between the cost of the good and the amount of money available on the prepaid card.

In concluding step 214, the consumer tenders the additional payment from a source of funds other than the prepaid card. This alternative source of funds could comprise cash, a check, or a credit card, or even some combination of these.

The conventional financial transaction method shown and described above in connection with FIGS. 1A-B can be used to complete a purchase transaction. However, this approach has a number of disadvantages.

For example, the transaction methodology is expensive to the merchant, because two separate requests (indicated with an * in FIG. 1B) for approval of the transaction are required to be transmitted through the payment processing system. By agreement, the merchant is generally charged for each of these approval requests. This increases merchants' costs and may reduce the merchants' profitability.

The conventional transaction method of FIGS. 1A-B is also cumbersome for the consumer. Specifically, the consumer must offer the prepaid card twice to the merchant, and wait while the merchant runs the two separate transaction requests through the payment processing system and receives two responses to those requests. Although this may not seem too burdensome or costly when viewed in isolation, millions of prepaid card transactions are conducted on a daily basis. The cumulative effect is potentially reducing the number of authorization requests and improving the efficiency of such purchase transactions is significant.

It is also worth noting that the conventional method shown in FIGS. 1A-B represents a best-care scenario, in that the payment processing system is configured to include the remaining balance in the message indicating the issuer's decline to authorize the original transaction. This extra functionality allows the consumer and merchant to know the exact balance remaining on the prepaid card, and to be assured of approval of the second request for authorization of the lesser amount.

However, most existing payment processing systems do not provide any remaining balance information with returned decline messages. This opens up the possibility that more than two authorization requests would be needed before a consumer would be able to use a prepaid card to buy a good or service that has a value that exceeds the available balance on he prepaid card. Such an iterative process would add additional expense, delay, and uncertainty to the purchase transaction.

Accordingly, there is a need in the art for improved transaction methods and systems conferring flexibility to the use of prepaid cards and other instruments utilized to conduct financial transactions.

SUMMARY

Embodiments of the invention are directed to methods, systems, and computer readable media for conducting financial transactions.

Embodiments of methods and systems in accordance with the present invention allow partial authorization of a financial transaction. In one embodiment, where a balance of a prepaid card is insufficient to cover the entire amount of a transaction, the issuer of the prepaid card transmits over a payment processing system, approval for only the amount remaining on the card. The transaction can then be completed by the purchaser tendering an additional sum from another source, such as a credit card or cash. Such automatic partial authorization in accordance with an embodiment of the present invention avoids the delay and cost associated with the merchant having to re-execute the transaction for a less than the entire amount.

An embodiment of a method in accordance with the present invention comprises, sending an authorization request message to an issuer over a payment processing network, the authorization request message comprising a request for authorization of a purchase amount associated with a purchase transaction, and receiving an authorization response message from the issuer, the authorization response message comprising an authorization for only a portion of the purchase amount.

An alternative embodiment of a method in accordance with the present invention comprises receiving from an electronic terminal, an authorization request message for a purchase amount, wherein the authorization request message is generated by an interaction between the portable consumer device and the electronic terminal. An available balance associated with a portable consumer device is determined, and an authorization response message is sent to the electronic terminal, the authorization message approving only a portion of the purchase amount.

An embodiment of a system in accordance with the present invention comprises a database configured to store information pertaining to a financial account of a consumer, and a server including a computer-readable storage medium and a processor operatively coupled to the database. The computer readable storage medium has code stored thereon for directing the processor to receive an authorization request message for a purchase amount by the consumer, determine an available balance associated with the financial account, determine a purchase amount portion of the purchase amount that would not exceed the available balance, and send an authorization response message approving only the purchase amount portion.

These and other embodiments of the invention are described in further detail below.

DETAILED DESCRIPTION

Figure 1A:
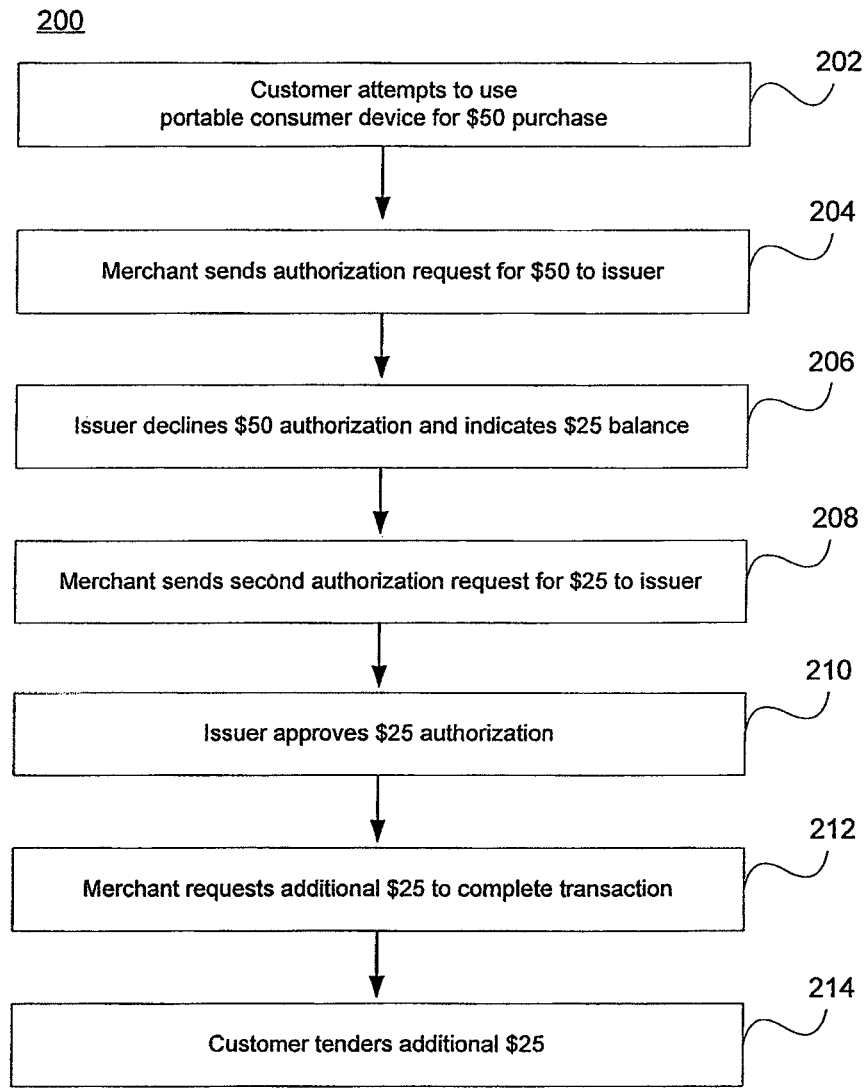
FIG. 1A shows a simplified flow diagram illustrating the course of a purchase transaction lacking partial authorization capability.

Embodiments of methods and systems in accordance with the present invention allow partial authorization of a financial transaction (e.g., a purchase transaction). In one embodiment, if a balance associated with a prepaid card is insufficient to pay for the entire cost of a good in a purchase transaction, the issuer of the prepaid card transmits over a payment processing network, approval for only the amount remaining on the card. The purchase transaction can then be completed by the consumer tendering an additional sum from another source, such as cash or a credit card. This automatic partial authorization process avoids the delay and cost associated with having to re-execute the transaction for a less than the entire amount (as described above).

In accordance with embodiments of the present invention, an authorization request message is created as a consumer purchases a good or service at a point of sale using a portable consumer device such as a prepaid card (e.g., a gift card, a stored value card, etc.), credit card, or debit card. Such a portable consumer device may take the form of a conventional magnetic stripe card, or a contactless card. Alternatively, the portable consumer device may take the form of a portable electronic device having a processor, such as a smart card, cell phone, or personal digital assistant (PDA), storing information regarding the financial account in electronic form. In still other embodiments, the portable consumer device can be virtual, for example where the financial information is represented by an account number known to the consumer and communicated to the merchant.

The authorization request message can be sent from the POS terminal located at a merchant to the merchant's acquirer, to a payment processing network, and then to an issuer or a third party processor of the issuer. Alternatively, the authorization request message can be sent from a third party engaged by the merchant to conduct transactions, for example a call center set up to handle telephone purchase transactions on behalf of a plurality of merchants. Further alternatively, the authorization response message can emanate from centralized location configured to receive purchase requests over the internet, in a manner analogous to a telephone call center.

An "authorization request message" can include a request for authorization to conduct an electronic payment transaction. It may include one or more of an account holder's payment account number, currency code, sale amount, merchant transaction stamp, acceptor city, acceptor state/country, etc. An authorization request message may be protected using a secure encryption method—e.g., 128-bit SSL or equivalent—in order to prevent data from being compromised.

An "authorization response message" is a message that is generated in response to the authorization request message. An authorization response message may include information regarding whether or not a transaction is authorized by an issuer or issuer's processor. As indicated below, the authorization request message may include other information in addition to information about whether or not the transaction is authorized or declined. For example, in certain instances the authorization response message may indicate the remaining amount of funds available.

Typically, an electronic payment transaction is authorized if the consumer conducting the transaction has sufficient funds or credit to conduct the transaction. Conversely, if there are insufficient funds or credit in the consumer's account for the entire purchase transaction, authorization is denied. Embodiments in accordance with the present invention avoid the inconvenience and loss of business opportunity existing in such situations. For example, as explained below, a portion of the requested authorization amount may be authorized by the issuer in embodiments of the invention.

Preferred embodiments of the invention may also use an acquirer and/or an issuer. An "acquirer" is typically a business entity, e.g., a commercial bank, that has a business relationship with a particular merchant. An "issuer" is typically a business entity (e.g., a bank) which issues a portable consumer device such as a credit or debit card to a consumer. Some entities such as American Express perform both issuer and acquirer functions. Embodiments of the invention encompass such single entity issuer-acquirers.

Figure 2:
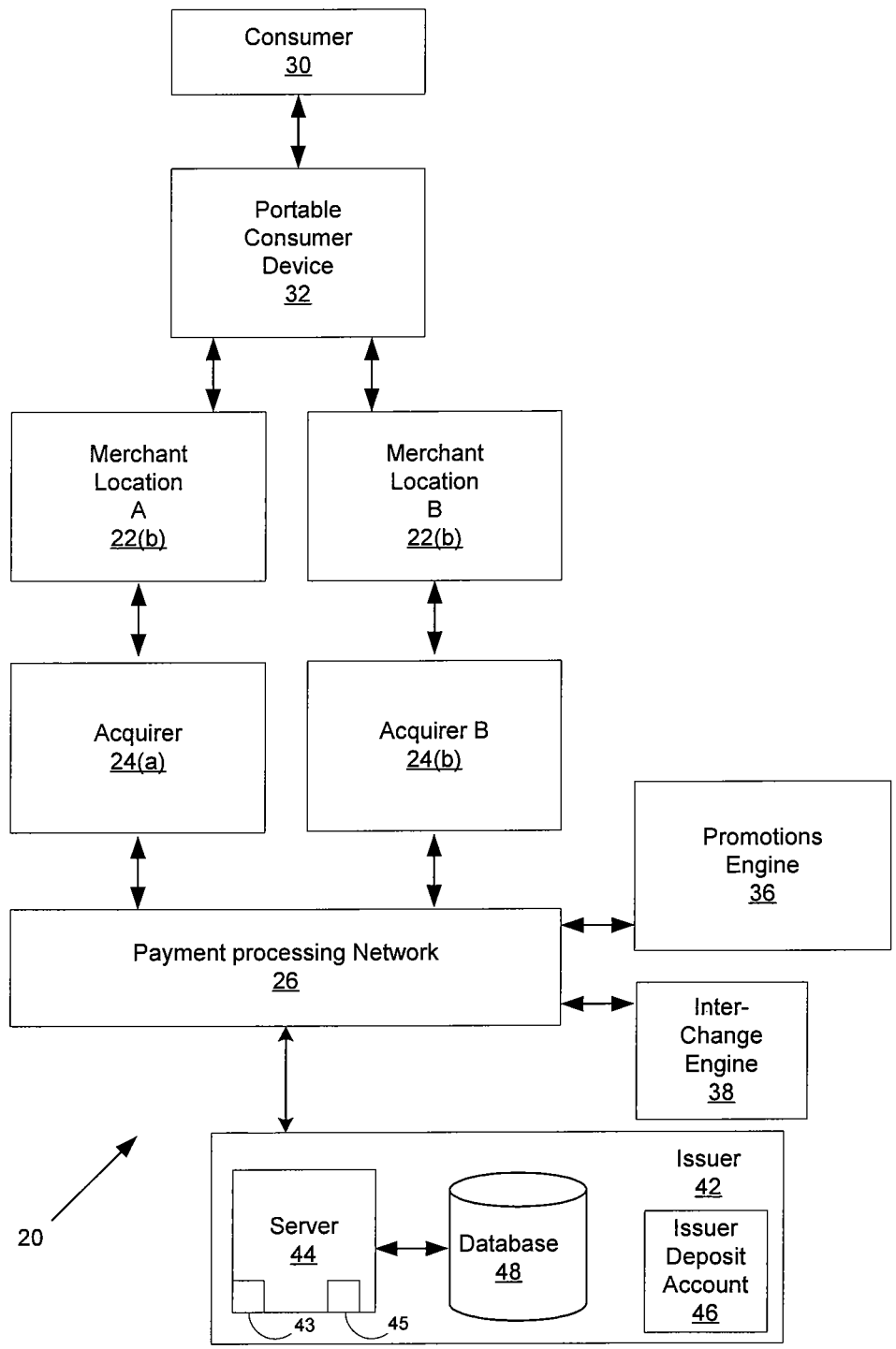
FIG. 2 shows a block diagram of a system including an acquirer, an issuer, and a transaction processing system according to the teachings of the present invention.

FIG. 2 shows a system 20 that can be used according to the teachings of the present invention. The system 20 includes merchant locations 22(a), 22(b) and acquirers 24(a), 24(b) associated with those merchant locations 22(a), 22(b). The different merchant locations 22(a), 22(b) may be affiliated with a single merchant, or may embody different merchants. The different merchant locations 22(a), 22(b) may represent the actual physical location of the merchants themselves, or the origin of a purchase transaction on behalf of the merchant (i.e. a call center or centralized internet node). A consumer 30 may purchase goods or services at the merchant locations 22(a), 22(b) using a portable consumer device 32. The acquirers 24(a), 24(b) can communicate with an issuer or issuer processor 42 via a payment processing network 26.

The portable consumer devices 32 according to embodiments of the invention may be in any suitable form. For example, the portable consumer devices can be hand-held and compact so that they can fit into a consumer's wallet and/or pocket (e.g., pocket-sized). For example, the portable consumer devices may include smart cards, ordinary credit or debit cards (with a magnetic strip and without a microprocessor), a keychain device (such as the Speedpass™ commercially available from Exxon-Mobil Corp.), etc. Other examples of portable consumer devices include cellular phones, personal digital assistants (PDAs), pagers, payment cards, security cards, access cards, smart media, transponders, and the like. The portable consumer device can also be virtual, in the form of an account number known to the consumer. The portable consumer devices 32 can also be debit devices (e.g., a debit card), credit devices (e.g., a credit card), or stored value devices (e.g., a stored value card). In some embodiments, the portable consumer devices 32 may be re-writeable so that values associated with the portable consumer devices 32 are stored on them. In other embodiments, the values associated with the portable consumer devices may be stored at a server operated by or at an issuer or processor of an issuer.

The payment processing network 26 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. Settlement in accordance with embodiments of the present invention can alternatively be accomplished utilizing single messaging service (SMS).

The payment processing network 26 may include a server computer. A server computer is typically a powerful computer or cluster of computers. For example, the server computer can be a large mainframe, a minicomputer cluster, or a group of servers functioning as a unit. In one example, the server computer may be a database server coupled to a web server. The payment processing network 26 may use any suitable wired or wireless network, including the Internet.

The merchant locations 22(a), 22(b) also have electronic terminals (not shown), such as point of sale (POS) terminals, that can interact with the portable consumer devices 32. Any suitable electronic terminal may be used, including magnetic stripe or contactless card readers. The card readers may include any suitable contact or contactless mode of operation. For example, exemplary card readers can include RF (radio frequency) antennas, magnetic stripe readers, etc. to interact with the portable consumer devices 32.

Two software engines are shown in communication with the payment processing network in the particular embodiment of FIG. 2. These software engines include a promotions engine 36 and an interchange engine 38.

The promotions engine 36 may be configured to generate specific rewards for the consumer. Such rewards may include discounts on specific purchases of specific products or at specific merchants. The interchange engine 38 may be used to calculate interchange fees or perform other interchange related functions.

Neither the promotions engine nor the interchange engine are required by all embodiments of the present invention. Moreover, various other software engines may also be included in the payment processing network to perform the methods according to embodiments of the invention. Such software engines can be accessible to the issuer or issuer processor 28, the payment processing network 26, or the acquirers 24(a), 24(b). Although the two software engines 36, 38 are shown as being directly accessible to the payment processing network 26, one or both may also or alternatively be directly accessible to the acquirers 24(a), 24(b) or the issuer 42.

The interchange engine 38 may perform interchange processing (as described above). The promotions engine 36 may contain or store the various promotional programs operated or initiated by the merchant. The promotions engine 30 may also contain computer code for: storing promotional programs from one or more merchants, identifying a particular promotional program associated with a particular authorization request message or transaction, performing tasks associated with the promotional programs, etc.

Figure 3A:
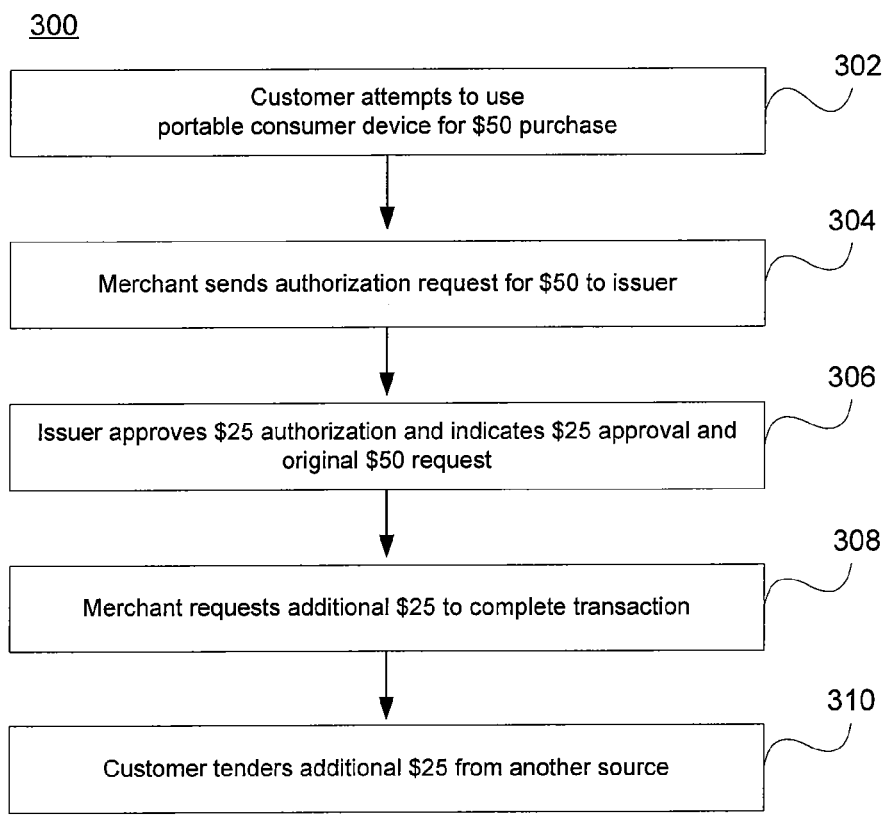
FIG. 3A shows a simplified flow diagram illustrating the course of a transaction involving partial authorization capability according to the teachings of the present invention.

The engines 36, 38 and any other software components or functions described in the instant patent application, may be implemented as software code to be executed by a processor using any suitable computer language such as, for example, Java, C++ or Perl using, for example, conventional or object-oriented techniques. For example, any of the specific steps (or combination of steps) shown in FIG. 3A illustrating the teachings of the present invention may be embodied as computer code on a computer readable medium in any suitable combination. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

As shown in FIG. 2, the issuer 42 may include an issuer deposit account 46. The issuer 42 may further include a host computer or server 44 including a computer readable storage medium 43 and a processor 45. The server 44 is in electronic communication with a database 48 configured to store information pertaining to a financial account of a consumer.

In accordance with certain embodiments of the present invention, the computer-readable storage medium 43 of the host computer 44 may have code stored thereon to direct the processor 45 to perform certain tasks. For example, code stored on the computer readable storage medium 43 may direct the processor 45 to, receive an authorization request message for a purchase amount by the consumer for a purchase or other transaction;

determine a balance available to a financial account of the consumer;

calculate a portion of the purchase amount that would not cause a balance of the financial account to exceed the available balance;

send an authorization response message approving only the purchase amount portion; and adjust the balance of the financial account of the consumer if the purchase or other transaction is conducted.

In accordance with certain embodiments of the present invention, the available balance may comprise an amount remaining on a prepaid card or in a prepaid account. In accordance with other embodiments, the available balance may comprise a credit limit. A credit limit may be the amount of credit that is available to the consumer at the present time. In accordance with still other embodiments, the available balance may reflect a minimum balance required of the financial account. For example, the available balance may be a minimum available balance associated with a debit account.

In accordance with certain embodiments, the computer readable storage medium may include code to direct a processor to include the available balance in the authorization message. The processor may be a component such as one or more microprocessor in the above-described server 44.

Figure 1B:
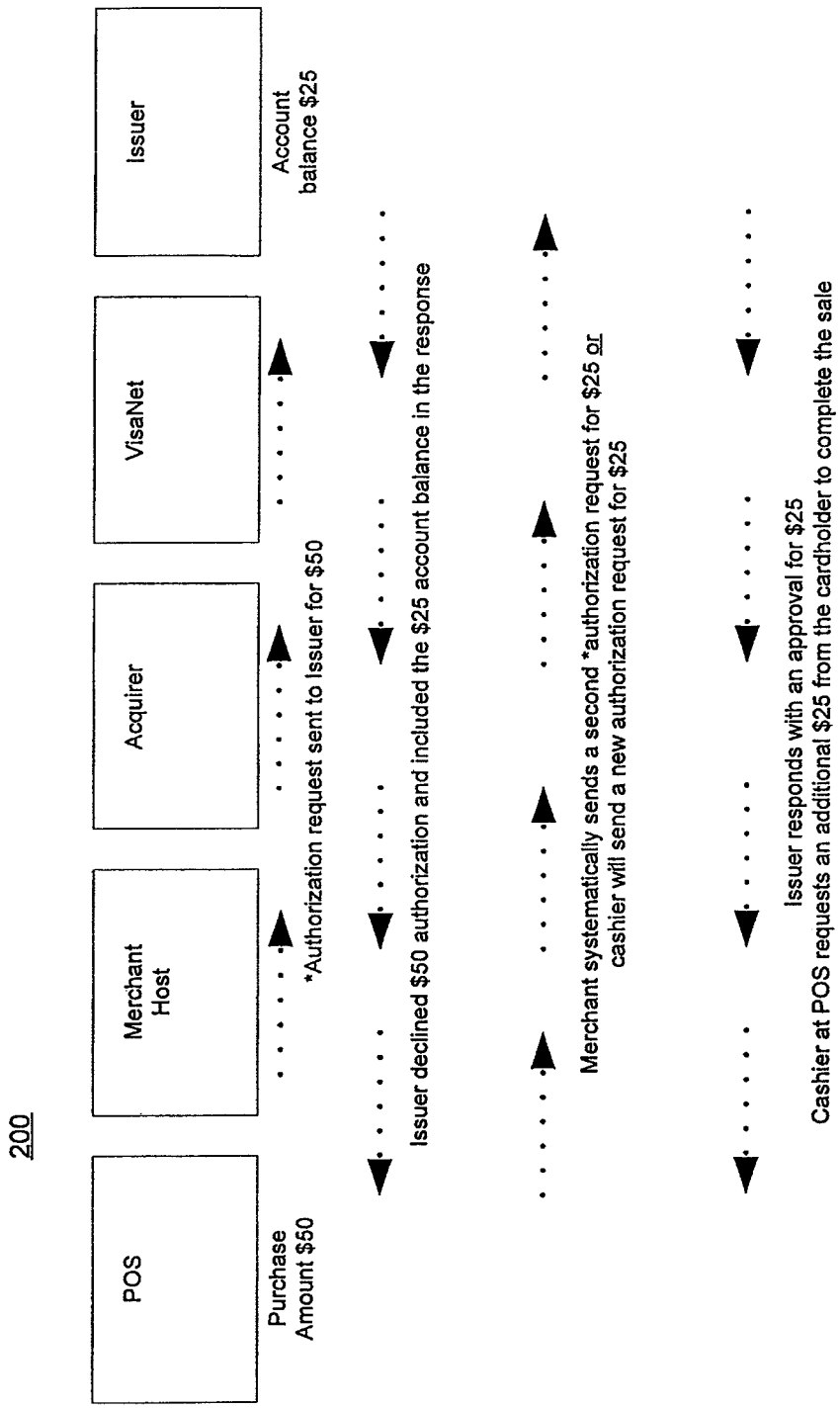
FIG. 1B is a simplified schematic diagram of the process flow of FIG. 1A.
Figure 3B:
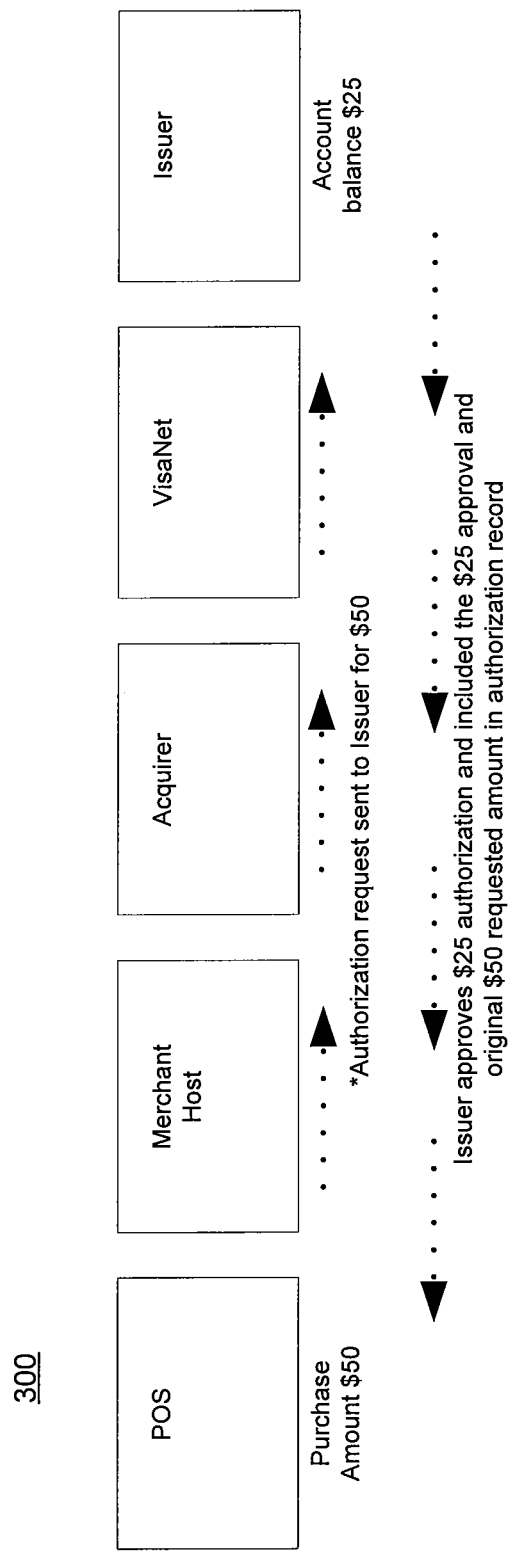
FIG. 3B is a simplified schematic diagram of the process flow of FIG. 3A.

As shown in FIGS. 3A-B, the conventional transaction process of FIGS. 1A-B may be favorably contrasted with the method in accordance with an embodiment of the present invention. FIG. 3A shows a simplified flow diagram of the method according to the teachings of the present invention, and FIG. 3B shows an overspending simplified schematic diagram illustrating the method according to the teachings of the present invention. The processes illustrated in FIGS. 3A-B may be described with reference to FIG. 2.

Specifically, in step 302 of flow 300, a consumer 30 attempts to use a portable consumer device 32 such as a prepaid card (or other financial instrument as described above) to pay for goods or services at a merchant or other (i.e. call center) location 22A in the course of conducting a purchase transaction. The total purchase amount for this purchase transaction is $50 in this example. In step 304, an employee of the merchant 22A or the consumer 30 uses information from the portable consumer device 32 to interact with an electronic terminal, for example a magnetic stripe card reader (not shown). The interaction may be a card swipe if the portable consumer device 32 is a card, or may be a contactless interaction if the portable consumer device includes a wireless element such as a RF antenna. The interaction may alternatively involve typing an account number into the electronic terminal where the consumer has provided a virtual portable consumer device in the form of an oral account number. After the interaction between the electronic terminal and the portable consumer device 32, the merchant 22A (or the terminal at the merchant) sends an authorization request message for the full amount (e.g., $50) through the acquirer 24(a), through the payment processing network 26, and to the issuer or issuer processor 42.

In step 306, the server 44 operated by or at the issuer or issuer processor 42 receives the authorization request message. The server 44 retrieves the appropriate balance information from the database 48. In this example, the server 44 determines that the existing balance associated with the portable consumer device 32 (e.g., on a prepaid card) is less than the full purchase amount. For example, the remaining balance associated with the portable consumer device 32 may be $25. The server 44 may also note in the consumer's account file that a transaction for $25 has been authorized, and may also calculate the remaining purchase balance (i.e., a differential amount) that would be required to conclude the purchase transaction. Information regarding the calculated purchase balance (or differential amount) can be included in an authorization response message that will be sent back to the merchant 22A.

Using the server 44, the issuer 42 transmits to the merchant 22A over the payment processing network 26 and via the acquirer 24A, an authorization response message. The authorization response message includes a message authorizing the consumer 30 and the merchant 22A to use the remaining balance of $25 associated with the portable consumer device 32 for the purchase transaction. The message may also include information regarding the additional amount to be tendered by the consumer 30 to complete the purchase transaction. For example, if the additional amount to be tendered is $25, then this information is included in the authorization response message along with information that the transaction is authorized for $25. This is compared to the situation described above in FIGS. 1A and 1B, where the authorization response message would simply include a message that declined the transaction.

In step 308, after receiving the authorization response message at a POS terminal, the purchase balance of $25 is printed on a receipt or displayed on a display associated with the POS terminal. The merchant 22A (or an employee or representative thereof) can thereafter request the consumer to tender the additional amount ($25) in order to make up difference between the entire purchase amount (here $50) and the partial amount authorized by the issuer 44 (here $25). In step 310 the consumer then tenders the additional amount (here $25) using another payment vehicle (e.g., cash, a check, a credit card, etc.) thereby successfully completing the purchase transaction. Thus, in accordance with embodiments of the present invention, at least two forms of payment may be used to pay for goods or services in a purchase transaction.

One purpose of embodiments in accordance with the present in invention is to enable an acceptance solution for two key issues of prepaid cards or other financial instruments that today, result in declined transactions. Embodiments in accordance with the present invention also advantageously enable the accelerated growth of additional and important applications for prepaid card utility and corresponding revenue generating opportunities.

Certain embodiments in accordance with the present invention allow the prepaid card issuer or processor of the issuer to return an authorization response message with the remaining available balance so that it can be printed on the sales receipt. This ability can apply to all authorization responses including approvals, partial approvals, and declines.

Utilizing embodiments in accordance with the present invention, prepaid card issuers will be able to submit authorization response messages with an approval for a portion of the amount requested—enabling the remaining amount to be paid from other sources. This partial authorization capability will reduce decline rates, and enhance consumer and merchant experiences. The partial authorization capability will also reduce customer service costs for the card issuer associated with declined purchase requests or other customer experience issues. As provided by embodiments in accordance with the present invention, merchants now have the ability to accept the authorization in conjunction with a split tender, rather than having to decline the sale as is currently required.

Whereas there currently exists the ability for providers/issuers of single merchant proprietary prepaid cards, to provide a sometimes coded "available balance" response, there has been no previous capability to create a separate and distinct message, that provides for a prominently displayed partial authorization and available balance, contained within an existing industry standard response and that supports the programs of a plurality of prepaid card issuers and issuer processors, and a plurality of prepaid card accepting merchants connected to a global payment processing network.

This partial authorization capability in accordance with an embodiment of the present invention uniquely supports Automated Fuel Dispenser (AFD) merchants, where traditionally high dollar initial authorization requests by the fuel industry and their merchants can exceed the balance available on the prepaid card resulting in an automatic decline and rendering a low dollar prepaid card useless at AFD's for this type of purchase transaction. The AFD merchant can now dispense the fuel up to the partially approved amount (available balance) returned by the issuer.

Also, embodiments enabling both the Balance Inquiry and Partial Authorization enhanced functionalities, can improve transaction approval rates to perhaps as high as 80% (from 65%), and reduce the consumer services expense associated with servicing those declined transactions. As embodiments in accordance with this invention may lower the issuer's cost of declines, it also causes it to become more predictable, thus enabling the potential availability of reduced and/or more creative issuer pricing.

Embodiments in accordance with the present invention may also allow a partial authorization to be communicated back to the position where the purchase amount exceeds a threshold value, such as a remaining balance or a credit limit. Such embodiments, however, would not allow a transaction to move forward in other situations where a denial is appropriate, for example where the consumer's portable consumer device is on a blacklist (e.g., it is indicated as missing, stolen, or canceled).

Additional details about various elements including issuers, acquirers, etc. can be found in U.S. patent application Ser. No. 11/266,766, filed Nov. 2, 2005 entitled "Method and System For Conducting Promotional Programs", incorporated by reference in its entirety herein.

Embodiments in accordance with the present invention have been described above primarily in connection with financial transactions conducted utilizing prepaid cards. This is because the relatively low dollar amounts available for prepaid cards means that these instruments are the most likely to have a transaction declined for insufficient funds to pay for the entire amount.

However, embodiments in accordance with the present invention are not limited to transactions involving prepaid card financial instruments, and can be used in conducting transactions with other types of financial instruments. Examples of such other types of financial instruments include credit cards having credit limits that cannot be exceeded, and debit cards linked to accounts having minimum balance requirements.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:

sending, by an electronic terminal, an initial authorization request message to an issuer over a payment processing network, the initial authorization request message comprising a request for authorization of a high purchase amount associated with a purchase transaction using a portable consumer device associated with a first payment source and issued by the issuer, wherein the high purchase amount is determined independent of an amount of a product to be dispensed associated with the purchase transaction, wherein the issuer determines an available balance associated with the first payment source and determines a portion of the high purchase amount that is (i) less than the high purchase amount and (ii) equal to the available balance;

receiving, by the electronic terminal in response to the initial authorization request message as part of the purchase transaction, an authorization response message from the issuer over the payment processing network, the authorization response message comprising an authorization for only the portion of the high purchase amount, wherein the authorization response message has a form in accordance with a legacy financial transaction protocol standard at least formerly supported by a plurality of issuers, and wherein the authorization response message participates in an adapted financial transaction protocol that remains in accordance with the legacy financial transaction protocol standard while being adapted such that the authorization response message is sent instead of a different type of authorization response message that declines the purchase transaction when the high purchase amount is greater than the available balance and without modifying the available balance associated with the first payment source;

dispensing, as part of the purchase transaction, an amount of the product associated with an actual purchase amount no greater than the portion of the high purchase amount authorized by the authorization response message, the actual purchase amount being based on the amount of the product actually dispensed; and sending, by the electronic terminal as part of the purchase transaction, a subsequent authorization request message to the issuer over the payment processing network, the subsequent authorization request message comprising a request for authorization of the whole actual purchase amount of the dispensed product associated with the purchase transaction using the portable consumer device associated with the first payment source and issued by the issuer.

2. The method of claim 1 wherein the initial authorization request message is based upon information from the portable consumer device.

3. The method of claim 2 wherein the portable consumer device comprises a prepaid card or prepaid account, and wherein the high purchase amount exceeds the available balance associated with the portable consumer device.

4. The method of claim 2 wherein the portable consumer device comprises a credit card, and wherein the high purchase amount exceeds the consumer's available credit limit.

5. The method of claim 2 wherein the portable consumer device comprises a debit card, and wherein the purchase amount is greater than the consumer's available balance for the debit card.

6. A method comprising:
receiving, at an issuer from an electronic terminal over a payment processing network, an initial authorization request message for a high purchase amount associated with a purchase transaction, wherein the initial authorization request message is generated by an interaction between a portable consumer device and the electronic terminal and the high purchase amount is determined independent of an amount of a product to be dispensed associated with the purchase transaction, the portable consumer device comprising a first payment source and issued by the issuer;
determining, at the issuer, an available balance associated with the portable consumer device;
determining, at the issuer, a portion of the high purchase amount that is (i) less than the high purchase amount and (ii) equal to the available balance;
sending an authorization response message to the electronic terminal over the payment processing network, the authorization message approving only the portion of the high purchase amount, wherein the authorization response message has a form in accordance with a legacy financial transaction protocol standard at least formerly supported by a plurality of issuers, and wherein the authorization response message participates in an adapted financial transaction protocol that remains in accordance with the legacy financial transaction protocol standard while being adapted such that the authorization response message is sent instead of a different type of authorization response message that declines the purchase transaction when the high purchase amount is greater than the available balance and without modifying the available balance associated with the portable consumer device; and
receiving, at the issuer from the electronic terminal over the payment processing network as part of the purchase transaction, a subsequent authorization request message comprising a request for authorization of a whole actual purchase amount of a dispensed product based on an amount of the product actually dispensed and being no greater than the portion of the high purchase amount authorized by the authorization response message.

7. The method of claim 6 wherein the portable consumer device comprises a debit card, and deduction of the high purchase amount would cause an account linked to the debit card to fall below a minimum balance.

8. The method of claim 6 wherein the authorization response message includes a remaining amount available on the portable consumer device.

9. A system comprising:
a database configured to store information pertaining to a first payment source comprising a financial account of a consumer, the first payment source associated with a portable consumer device issued by an issuer; and
a server including a computer-readable storage medium and a processor operatively coupled to the database, the issuer including the server and the database, the computer readable storage medium having code stored thereon for directing the processor to, at least:
receive, over a payment processing network, an initial authorization request message for a high purchase amount associated with a purchase transaction using the portable consumer device, wherein the high purchase amount is determined independent of an amount of a product to be dispensed associated with the purchase transaction;
determine an available balance associated with the financial account;
determine a portion of the high purchase amount that is (i) less than the high purchase amount and (ii) equal to the available balance;
send, over the payment processing network, an authorization response message approving only the portion of the high purchase amount, wherein the authorization response message has a form in accordance with a legacy financial transaction protocol standard at least formerly supported by a plurality of issuers, and wherein the authorization response message participates in an adapted financial transaction protocol that remains in accordance with the legacy financial transaction protocol standard while being adapted such that the authorization response message is sent instead of a different type of authorization response message that declines the purchase transaction when the high purchase amount is greater than the available balance and without modifying the available balance associated with the financial account; and
receive, over the payment processing network as part of the purchase transaction, a subsequent authorization request message comprising a request for authorization of a whole actual purchase amount of a dispensed product based on an amount of the product actually dispensed and being no greater than the portion of the high purchase amount authorized by the authorization response message.

10. The system of claim 9 wherein the available balance reflects a minimum balance required of the financial account.

11. The system of claim 9 wherein the computer readable storage medium further comprises code stored thereon to direct the processor to include the available balance in the authorization response message.

12. The method of claim 1, wherein the purchase transaction is with respect to a product or service capable of being provided in partial amounts and, responsive to the authorization for only the portion of the high purchase amount, a corresponding portion of the product or service is provided.

13. The method of claim 12, wherein providing the product or service capable of being provided in partial amounts comprises dispensing a fuel.

14. The method of claim 1, wherein the legacy financial transaction protocol standard comprises the VISANET BASE I standard or the VISANET BASE II standard and the form of the authorization response message is in accordance with the VISANET BASE I standard or the VISANET BASE II standard.

15. The method of claim 1, wherein the authorization request message has a form in accordance with the legacy financial transaction protocol standard that includes (i) a payment account number corresponding to the first payment source and (ii) a merchant transaction stamp created by the electronic terminal based at least in part on the purchase transaction such that the merchant transaction stamp is different for different transactions.

16. The method of claim 1, wherein, in an unadapted financial transaction protocol in accordance with the legacy financial transaction protocol standard, the request for authorization of the high purchase amount associated with the initial authorization request message is declined.

17. The method of claim 1, further comprising, responsive to receiving the subsequent authorization request message, modifying the available balance to reflect a completed purchase of the amount of the dispensed product.

18. The method of claim 1, wherein fewer authorization request messages are sent in the adapted financial transaction protocol relative to an unadapted financial transaction protocol in accordance with the legacy financial transaction protocol standard.

* * * * *